March 27, 1973 D. L. RADFORD 3,723,305
HEMODIALYSIS
Filed Jan. 13, 1971 4 Sheets-Sheet 1
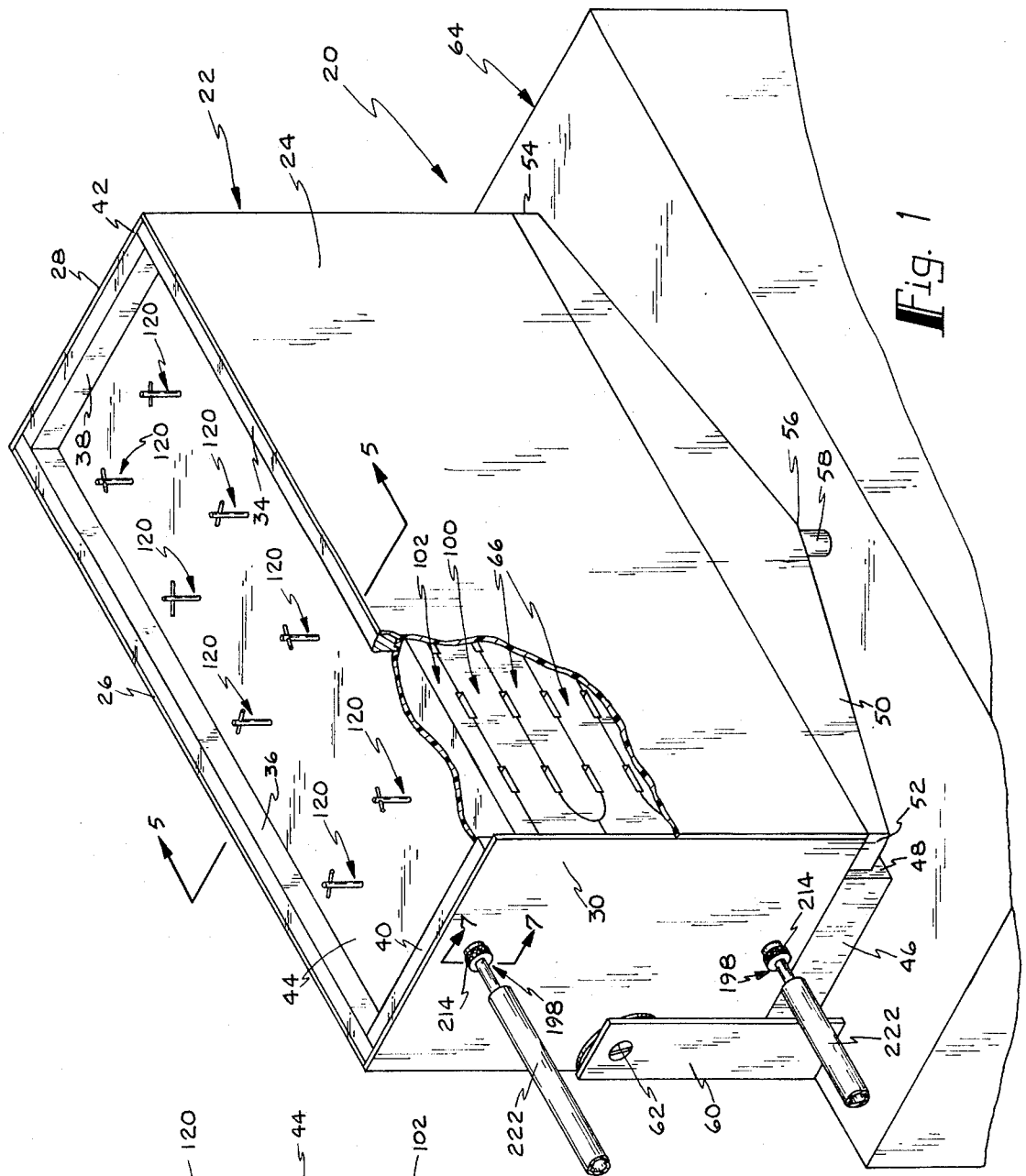
INVENTOR.
DAVID L. RADFORD
BY
H. Rose Workman
HIS ATTORNEY

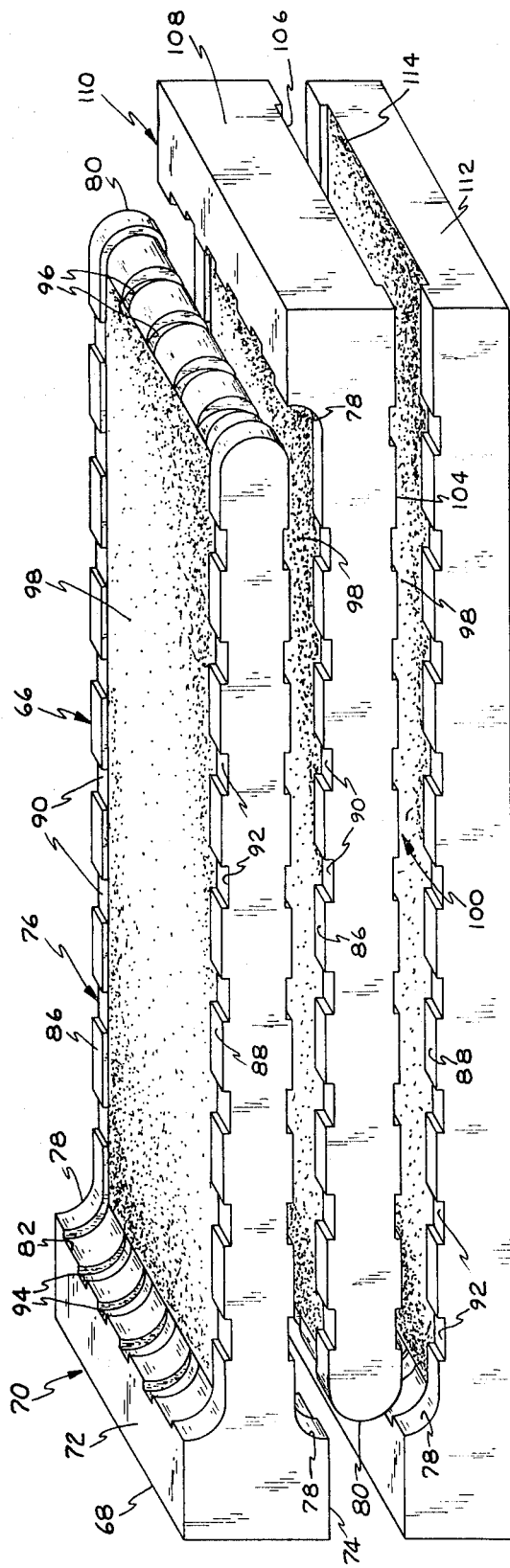
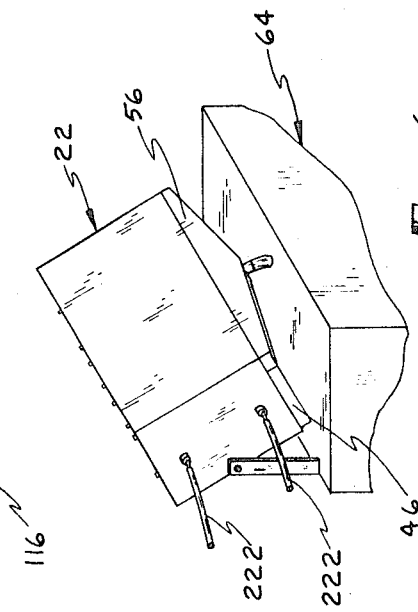

March 27, 1973  D. L. RADFORD  3,723,305
HEMODIALYSIS
Filed Jan. 13, 1971  4 Sheets-Sheet 3

INVENTOR.
DAVID L. RADFORD
BY
H. Ross Workman
HIS ATTORNEY

March 27, 1973   D. L. RADFORD   3,723,305
HEMODIALYSIS

Filed Jan. 13, 1971   4 Sheets-Sheet 4

INVENTOR.
DAVID L. RADFORD
BY
H. Ross Workman
HIS ATTORNEY

3,723,305
HEMODIALYSIS
David L. Radford, Salt Lake City, Utah, assignor to Vital
  Assists, Inc., Salt Lake City, Utah
Filed Jan. 13, 1971, Ser. No. 106,184
Int. Cl. B01d 31/00
U.S. Cl. 210—22                                       23 Claims

ABSTRACT OF THE DISCLOSURE

Hemodialyzing method and apparatus including a plurality of elongated separators having surfaces comprised of densely spaced points. The separators are assembled by generally vertically stacking the separators, the separators being contoured so that a convoluted path exists therebetween. The convoluted path is adapted to removably receive an elongated tubular membrane. Blood is forced through the membrane and dialyzing fluid is forced around the membrane between the spaced points in a direction which crosses the flow of blood. The membrane is replaced by serially removing a separator to expose a portion of the convoluted path, removing the membrane from the exposed portion of the path and removing another separator to support another portion of the path and so on until the membrane can be completely removed. A new membrane is inserted by repeating the mentioned process in reverse order. A novel coupling nipple is disclosed which fits into each end of the tubular membrane, the coupling nipple being attachable at any desired location along the length of the membrane and, once attached, is adjustably mounted in a container for the separators to exert a predetermined tension on the tubular membrane as the membrane traverses the convoluted path.

BACKGROUND

Field of the invention

The present invention relates to novel method and apparatus for improved hemodialysis.

The prior art

Historically, kidney diseases have been of critical concern to human life. Many kinds of kidney diseases interfere with the function of the kidney such that the kidney ceases to remove waste and excess water from the blood. When the kidney is sufficiently impaired that a large portion of the waste products and water are not removed from the blood, the life of the patient cannot be preserved unless a way is provided for artificially performing the function of the impaired kidney.

An early advancement in the artificial kidney art was founded upon the theory of the kiil kidney which was based on the principle that waste materials can be removed by dialysis through a membrane, through which desirable blood components do not pass. The theory under which the kiil kidney operates is that when the blood, having a relatively high concentration of waste products is separated from a dialysate fluid, having a very low concentration of waste products, by a membrane, the waste products will migrate from the high concentration fluid (blood) through the membrane to the low concentration fluid (dialysate). Excess water can, at the same time, be removed from the blood by ultrafiltration, through the membrane by maintaining a positive pressure differential between the blood and the dialysate fluid on the opposite side of the membrane.

There are various types of conventional artificial kidneys other than the kiil type. The best known is the coil-type (Kolff) kidney in which a cylindrically coiled membrane is continuously exposed to circulating dialyzing fluid. However, the present invention is structurally most closely related to the kiil-type kidney and therefore attention is directed thereto.

The Kiil kidney comprises a plurality of large flat membranes supported by grooved plates in a sandwich-like construction. Each pair of grooved plates normally is provided with two taut membranes between them. The plates and membranes are held together with a number of bolts which must be carefully tightened individually to develop a precise torque. The precision torque is necessary to insure that there is sufficient compressive force to prevent leakage of blood and/or dialysate but not so much force that the membrane is damaged. Dialysate fluid is normally caused to flow through the assembly between the grooves of each plate in counterflow to the patient's blood which is caused to flow through the assembly between the two membranes. The blood has a higher absolute pressure than the dialysate fluid so that the blood pressure keeps the membranes spaced apart.

Unfortunately, however, it has been found that current clinical practice in the hemodialysis of chronic uremics requires from fourteen to as many as thirty hours of dialysis for weekly treatments with a Kiil dialyzer, depending upon the body weight of the patient and the flow rate of the blood. Moreover, the intricate and elaborate structure normally forming the Kiil dialyzer requires much effort to assemble, prime and operate the Kiil dialyzer. Also, the membranes used in the Kiil dialyzer are not easily replaced without substantial effort, not only in the disassembly and reassembly of the dialyzer apparatus but also in aseptic technique which is critically essential to preserve the patient from septicemia.

Most recently, efforts have been made to improve upon the Kiil kidney hemodialysis to avoid some of the most objectionable of the aforementioned limitations. A point support surface was substituted for the grooves in the plates in the dialyzer produced by Western-Kiil of Compton, Calif. Other improvements are found in U.S. Pats. 3,443,388 and 3,458,048. Nevertheless, until this present invention, no Kiil-type apparatus or method has been found which satisfactorily increases the mass transfer rate necessary to reduce the time for hemodialysis without excessively increasing resistance to blood flow and dialysate flow, increasing hemolysis through excessive blood turbulence, increasing bulk flow or substantially increasing extracorporeal blood volume.

A significant modification in the Kiil kidney is described in a service manual prepared by Medizintechnische Geräte, Paul Scheibner KG, DDR 9402 Bernsbach, Beierfelder Strasse 18. The Scheibner service manual discloses a hemodialyzer which uses an elongated membrane held in a vertical convoluted configuration by a plurality of separators, blood being pumped in at one end of the membrane and out the other while dialysate is pumped between the separators and the membrane at the other end of the membrane to counterflow along substantially the entire length of the membrane.

Despite the forgoing advancements in hemodialysis, except for this present invention, the existing hemodialyzing apparatus remains intricate, difficult to use aseptically and still requires long periods of time to completely dialyze the blood of each patient.

BRIEF DESCRIPTION AND OBJECTS OF THE INVENTION

The present invention, as indicated by the described preferred embodiments, accommodates hemodialysis of the blood of a patient in a surprisingly rapid time with apparatus unusually simple to assemble and use. A way is provided whereby the hemodialyscis apparatus may be aseptically assembled for use with the membrane in a short period of time with very little technical skill. Method and apparatus is disclosed which accommodates rapid facile replacement of membranes and also provides for dialyzing blood without subjecting both the blood and dialysate to substantially increased pressure normally required when the dialysate and blood are pumped counterdirectionally.

It is, therefore, a primary object of the present invention to provide novel hemodialysis apparatus.

It is another primary object of the present invention to provide a novel method of hemodialysis having a surprising level of effectiveness so that blood is effectively dialyzed in a comparatively short period of time.

It is another valuable object of the present invention to provide an improved membrane which is easily replaceable aseptically and can be adjusted to a predetermined tension over supporting members.

One still further object of the present invention is the provision of a novel blood coupling nipple which can be attached to the membrane at any position along the length of the membrane.

Another significant object of the present invention is the provision of improved hemodialyzing apparatus and method accommodating cross-flow of dialysate fluid and blood.

Another object of the present invention is an improved method for replacing hemodialyzing membranes.

These and other objects and features of the present invention will become more fully apparent from the following description taken in conjunction with the accompanying drawings.

BRIEF DESCRIPTION OF THE DRAWINGS

FIG. 1 is a fragmentary perspective view of a presently preferred hemodialyzer embodiment, portions being broken away to reveal inner parts;

FIG. 2 is an exploded perspective view of separator plates used with the embodiment of FIG. 1;

FIG. 3 is an enlarged fragmentary cross-sectional view of the separators of FIG. 2, particularly illustrating the relation of the membrane and point supports;

FIG. 4 is an elevational view shown partly in cross-section of presently preferred clamp apparatus for maintaining the separators in assembled relation;

FIG. 6 is a fragmentary perspective view of the hemodialyzer of FIG. 1 tilted about its longitudinal axis;

DETAILED DESCRIPTION OF THE PREFERRED EMBODIMENTS

General

Figure 5:
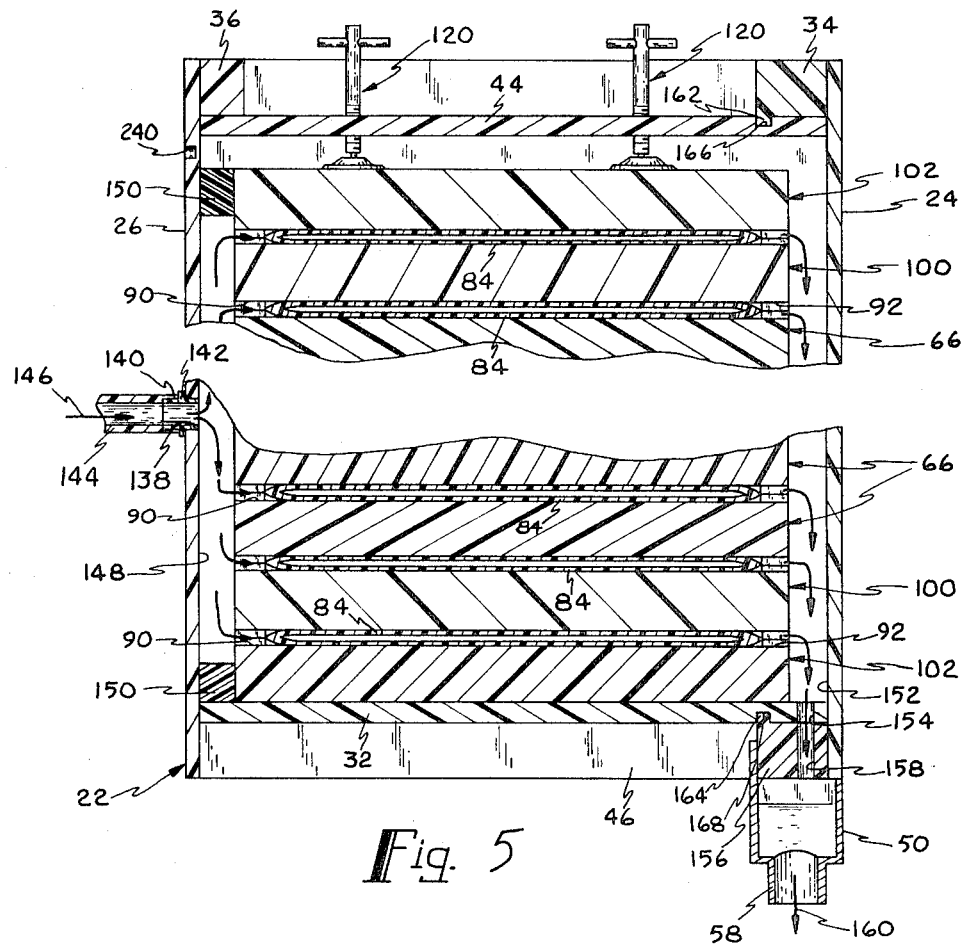
FIG. 5 is a transverse cross-section taken along line 5—5 of FIG. 1, portions of FIG. 5 being broken away for ease of illustration.

Hemodialysis is the removal of waste products and excess water from blood through a membrane. Dialysate solution is defined as a liquid having a low concentration of waste products which facilitates the movement of waste products from blood through a membrane into the liquid. Most commercially available dialysate solutions consist of a buffered saline solution. In the present invention, blood is separated from a dialysate solution with a membrane.

According to the present invention, dialysate is caused to flow in a direction which crosses the flow path of the blood from a patient. Cross-flow of dialysate and blood is novel in a Kiil-type kidney such as that herein described and results in some surprising advantages.

First, it is well known that the prior art counter-flow kidneys required a high pressure to be exerted upon dialysate solution to force the dialysate through an elongated path. Because the length of the path was substantial, there was much resistance to flow of the dialysate. Cross-flow allows the dialysate to flow over a much shorter path thereby minimizing the resistance to flow and reducing the pressure which must be exerted upon the dialysate. Reduced pressure on the dialysate also allows the pressure which must be exerted on the blood to be reduced proportionately.

Secondly, the short time during which the dialysate is exposed to the blood-carrying membrane does not completely saturate the volume of dialysate exposed to the membrane before the dialysate is moved out of contact with the membrane. The dialysate is then, according to this invention, recirculated for additional exposure to the membrane. Since the dialysate exposed to the membrane does not become concentrated with waste products to the same extent as occurs with counterflow-type apparatus, there is always a greater concentration gradient between the blood and the dialysate which maximizes the rate of dialysis.

It has been reported that in order to maintain a satisfactory level of uremia, each dialysis one liter of blood per kilogram of body weight should be dialyzed. Therefore, the actual amount of time during which a patient must undergo hemodialysis depends upon his body weight and also upon the rate of flow of blood through the hemodialyzer. According to the present invention, the comparatively long length of the convoluted membrane (described hereafter) allows the flow rate of the blood to be increased over membranes having a reduced area of exposure to dialysate.

It should also be observed that children and persons of small stature will require the use of membranes which receive a smaller volume of blood than adults and larger persons. Otherwise the extracorporeal blood would dangerously reduce the volume of blood remaining in the patient. The present invention accommodates a wide variety of membrane sizes without exchange of other structural members of the apparatus.

A primary feature of the present invention is the provision of a membrane embodiment with included coupling nipples (hereafter more fully described) which are pre-sterilized with ethylene oxide or other suitable sterilizing agent so that the hemodialyzer can be used immediately upon assembly of the membrane in the hemodialyzer. Thus, the entire blood path through the hemodialyzer may be aseptically provided for use at any time without first assembling the membrane into the hemodialyzer. This is a substantial improvement in the availability of hemodialyzing apparatus. For example, currently used conventional Kiil-type dialyzers require the membrane to be first assembled in the dialyzer with all of the dialyzing plates carefully tightened into position. Thereafter, a cold sterilizing fluid such as Formalin is injected into the membrane and blood inlet and outlet ports. The sterilizing fluid is allowed to set in the assembled hemodialyzer from a minimum of two hours to as many as twenty-four hours. Thereafter, the hemodialyzer must be carefully flushed with sterile water or saline solution before the pateient's blood can be passed into the membrane. Thus, for each use of the conventional Kiil-type hemodialyzers, there must be a minimum of two hours down time in which the hemodialyzer cannot be used.

According to the present invention, the hemodialyzer may be used immediately upon assembly of the membrane into the hemodialyzer and, subsequent to use, the membrane may be removed, discarded and a replacement membrane, which is completely sterile, may be again assembled into the hemodialyzer of this present invention for immediate use.

The apparatus

Referring now to FIG. 1, the presently preferred embodiment of the hemodialyzer of this invention is generally designated 20. The hemodialyzer 20 includes a container 22 having front and rear sides 24 and 26, respectively, and ends 28 and 30. The container has a bottom 32 (FIG. 5) which is rigidly attached to the ends 28 and 30 and also to the back 26 but is separable from the front side 24. If desired, the bottom 32, rear side 26 and ends 28 and 30 may be of one-piece molded consruction. Preferably, at least part of the container 22 is transparent so that any blood leak into the container 22 can be immediately visually detected.

Inwardly projecting ribs 34 and 36 are respectively mounted upon the front and rear sides 24 and 26. Similarly, ends 28 and 30 have inwardly projecting ribs 38 and 40 mounted thereon. The ribs 34, 36, 38 and 40 cooperate to form a peripheral shoulder around the upper edge 42 of the container 22. A cap or lid 44 is urged against the shoulder formed by the ribs 34, 36, 38 and 40 so as to close the container 22 as will be subsequently more fully described.

The container 22 has a downwardly depending skirt 46, the forward face 48 of the skirt abutting a generally hollow chute 50. The chute 50 tapers from the ends 52 and 54 downwardly to a vertex at 56. A downwardly directed outlet port 58 is mounted in the chute at the vertex.

Preferably, the container 22 is rotatably connected at the ends 28 and 30 to a vertically projecting bracket 60. Preferably, the bracket and container 22 are coupled together by means of a screw 42, dowel or other connecting member accommodating displacement of the container 22 about its longitudinal axis (see also FIG. 6). The bracket 60 is mounted directly upon a console generally designated 64. Although the console is schematically shown in FIG. 1, it may be conventional and may include conventional hemodialyzing support systems such as blood pumps, a reservoir of dialysate solution, a pump for dialysate solution, recirculation conduit and measuring apparatus such as used in measuring the temperature and pressure of the blood and dialysate solution.

The container 22 receives a plurality of plate-like separators of three different types generally designated 66, 100 and 102 which are assembled in stacked relation within the container 22. The separators can best be understood by reference to FIG. 2. Each separator generally designated 66 is generally T-shaped in longitudinal cross-section. The separator 66 has a head portion 70 which includes a top end 68 normally abutting the end walls 28 or 30 of the container 22. The head 70 has upper and lower faces 72 and 74, respectively, which are substantially flat. The head 70 is integrally connected to a laterally-extending body generally designated 76, the body having a vertical dimension which is substantially reduced over the vertical dimension of the head 70. The body 76 and head 70 are connected by a neck portion 78 which traverses an arcuate path from the faces 72 and 74 of the head 70 to the corresponding upper and lower surfaces of the body 76.

The body 76 terminates in a rounded foot portion 80, the rounded foot portion 80 traversing an arcuate path. The arc traversed by the foot 80 has a radius which is substantially the same as the radius traversed by the arc forming the neck 78. Thus, when the separators 66 are vertically stacked as shown in FIGS. 1 and 2, the rounded foot 40 nests against the complementarily-configured neck portion of adjacent separator 66.

The separator 66 is centrally recessed as at 82 from the neck portion 78 through the length of the body 76 and around the foot portion 80. The recess 82 provides a pleated or S-shaped pathway for the tubular membrane 84 (not shown in FIG. 2). Recess 82 forms peripheral flanges 86 and 88 along the front and rear edges of the separator 62 from the neck 78 along the length of the body 76 and around the foot portion 80. The flanges 86 and 88 are notched at spaced locations along the length of the body 76 so as to form flow ports 90 and 92 therein. The flow ports 90 and 92 allow dialysate to flow transversely across the recessed portion 82 of the body 76.

In the illustrated embodiment, the neck portion 78 has a plurality of grooves 94 which are concentric with the neck portion 78 and aligned with the membrane path formed by the recess 82. Similarly, the foot portion 80 has a plurality of grooves 96 generally concentric with the foot portion 80 and aligned with the membrane path formed by the recess 82. When a tubular membrane is disposed between separators over the path formed by the recess 82, the grooves 94 and 96 permit unrestricted flow of blood around the foot portion and neck portions of the separators.

The body portion 76 of the separator 66 has a point support surface 98 over the entire length of the body portion 76. The point support surface 98 is formed of a plurality of tiny pyramid-shaped supports rising out of the bed of the recess 82 to a level slightly below the height of the flanges 86 and 88. The relationship of the point supports 98 to flange 88 can best be understood by reference to FIG. 3. FIG. 3 illustrates the point supports 98 spaced downwardly from the flange 88 a distance approximately equal to one-half the transverse dimension of the inflated membrane 84.

Although the point support surface 98 has been described as being formed of tiny pyramid-shaped point supports, conical or any other suitable type of point supports could be used. Moreover, if desired, the point support surface 98 can traverse both the neck portion 78 and also the foot portion 80 of the separators 66. In that event, it may be desirable to place recesses similar to recesses 90 and 92 along the neck and foot portions 78 and 80, respectively, to facilitate flow of dialysate solution in those regions.

With continued reference to FIG. 2, separators 100 and 102 are illustrated. Separators 100 and 102 are, in many respects, substantially identical to separator 66. However, separator 100 differs from separator 66 in that it is generally L-shaped in longitudinal cross-section so as to have a generally flat lower surface 104 which is recessed as at 106 through the top end 108 of the L-shaped head 110.

The separator 102 is substantially the same as separator 100 except that the foot portion 112 is extended so as to terminate flush with the top end 108 of separator 100. The recess 114 of the separator is aligned with recess 106 and projects through the foot portion 112. Thus, as the membrane traverses the path formed by recesses 82, 106 and 114, the membrane will be exposed to the exterior of the assembled separators through the recesses 106 and 114. Significantly, as will be hereinafter more fully described, the membrane is coupled to an inlet or outlet port for conducting blood into or out of the membrane 84.

The separator 102 also differs from separators 66 and 100 in that separator 102 is completely flat along its lower surface 116 so as to rest flush upon the bottom 32 of container 22 (FIGS. 1 and 5). It has been found that separators unitarily molded from lightweight synthetic resin are preferable.

When the separators 66, 100 and 102 have been assembled in generally vertically stacked relation as shown in FIG. 1, they are urged together with hold-down clamps. Although any suitable hold-down clamp could be used, in the illustrated embodiment the clamp generally designated 120 and shown in FIG. 4 has been found adequate. The clamp 120 comprises an elongated shaft 122 which has an exteriorly threaded end portion 124. The threaded portion 124 is received in mating relation by an interiorly threaded bore 126 in the cap or lid 44 (shown also in FIG. 1). The shaft 122 projects upwardly away from the lid 44 and has a cross member 128 adjacent its terminal exterior end. The cross member 128 facilitates finger adjustment of the pressure exerted by the hold-down clamp 120 upon the stacked separators as will hereafter be more fully described.

The threaded end 124 of shaft 122 terminates in a flat surface 130, the surface 130 having a centrally-located internally-threaded blind bore 132. The bore 132 receives the threaded shank of a screw 134. Screw 134 mounts an engaging member 136 upon the shaft 122, engaging member 136 serving to spread downwardly-exerted force through the clamp 120 over a comparatively large surface area on the uppermost separator 102.

The stacked position of the separators 66, 100 and 102 is best shown in FIG. 5. The assembled separators are carried within the container 22 and supported upon the bottom 32. As shown, the clamps 120 have been adjusted so as to exert a downward pressure upon the separators 66, 100 and 102 and at the same time exert an upward pressure against the cap or lid 44 forcing the lid tightly against ribs 34 and 36.

The rear side 26 has a generally centrally-disposed port 138, the port receiving an insert 140 having opposed male coupling ends separated by an annular flange 142. One of the male coupling ends is inserted into the port 138, the one end having an axial length which is substantially the same as the transverse dimension of the rear side 26 so that the insert 140 is flush with the side 26. The other coupling end is adapted to be press-fit or otherwise suitably secured to a hollow conduit 144 which conducts dialysate in the direction of arrow 146. The conduit 144 and the insert 140 direct dialysate to the interior of the container 22.

As can be appreciated by continued reference to FIG. 5, the separators 66, 100 and 102, while in vertically aligned relation, are all spaced from the rear side 26 so as to form a chamber 148. The chamber has a peripheral seal 150 which forms a closed loop around the periphery of chamber 148 between the assembled separators and the rear side 26. The seal 150 may be made of any suitable material, one satisfactory material being polystyrene foam. The seal 150 need not be fluid or pressure tight but merely restricts the flow of dialysate fluid through the seal so as to maintain a positive dialysate fluid pressure in the chamber 148. When the separators illustrated in FIG. 2 are assembled as shown in FIG. 5 and when membrane 84 is disposed over the membrane path formed by the recess 82 (FIG. 2) flow ports 90 and 92 are aligned as shown in FIG. 5 to allow dialysate to flow freely through the ports 90 around the membrane 84. The point supports 98 (shown in FIGS. 2 and 3) upon which the membrane 84 is supported allow dialysate to flow along the periphery of the membrane from the ports 90 to the ports 92 generally transversely across the membrane 84. As the dialysate emerges from the ports 92, it accumulates in a chamber 152 formed in the space between the vertically-aligned separators 66, 100 and 102 and the front side 24.

In the region of chamber 152, the bottom 32 is provided with elongated slots 154. Similarly, a lower rib 156 of the front side 24 has elongated slots 158 which are aligned with slots 154 to allow dialysate accumulating in the chamber 152 to gravity flow to the interior of hollow chute 50 and, thereafter, through outlet port 58 in the direction of arrow 160.

As will be hereafter more fully discussed, the front side 24 is removable from the container 22 and is not rigidly secured as are the ends 28 and 30, rear side 26 and bottom 32 (see also FIG. 1). In order to maintain the front side 24 in proper position during use, the ribs 34 and 156 are respectively provided with downwardly-projecting tongues 162 and 164. Tongues 162 and 164 are respectively received by mating grooves 166 and 168 carried by the lid 44 and the bottom 32, respectively. When the clamps 120 are adjusted to cause an upward force to be exerted by the lid 44 against ribs 36 and 34, as shown in FIG. 5, the tongue and groove coupling of the front side 24 with the lid 44 and bottom 32 will prevent inadvertent separation of the front side 24 from the container 22. Furthermore, when desired, the clamps 120 may be loosened to allow the ribs 34 and 156 to become separated from the lid 44 and bottom 32, respectively.

It has been found, on occasion, that a greater volume of dialysate solution tends to flow beneath the membrane 84 than flows over the membrane 84 when the container is situated in the orientation of FIG. 5. The flow of dialysate beneath and over the membrane 84 can be advantageously affected by tilting the container 22 as shown in FIG. 6. With continued reference to FIG. 6, the container 22 is tilted along its longitudinal axis. Preferably, the tilt of container 22 can be maintained through suitable locking structure (not shown). Although container 22 may be successfully used when positioned in any one of a plurality of degrees of rotation, a position approximately 15° from the direct vertical position of FIG. 5 has been found to be satisfactory. Although the tilting of container 22 is desirable in some circumstances, changes in blood pressure, blood flow rate and dialysate pressure may make tilting unnecessary or even undesirable.

When the separators 66, 100 and 102 are properly assembled in the container 22, the clamps 120 are rotated with the fingers until the separators are snugly compressed together. Notably, exact pressure measuring and gauging conventionally required by prior art devices is not necessary in the present embodiment because regardless of how tightly the clamps 120 force the separators 66, 100 and 102 together, none of the force is transferred directly to the membrane between the separators. On the contrary, the flanges 86 and 88 (FIG. 2) insure uniform spacing between the point support surfaces of the separators. Furthermore, contrary to the conventional prior art devices, failure to tighten clamps 120 a predetermined amount will not cause blood to leak from the membrane into the dialysate solution. In conventional prior art hemodialyzers, blood inlet and outlet ports are sealed to the membrane by sandwiching the membrane between port structure and the separators. Thus, intense pressure must be exerted through the separators to prevent leakage of blood from around the port. The membrane of this presently preferred embodiment is not sealed to inlet and outlet ports between the separators. The inlet and outlet ports are sealed in the container 22, flush with the container end wall as will now be more fully described.

Figure 7:
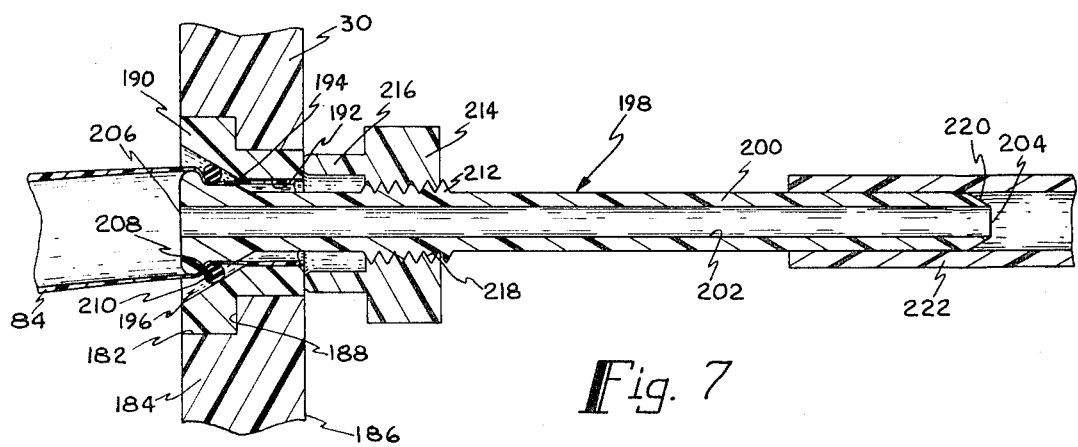
FIG. 7 is a cross-section taken along line 7—7 of FIG. 1.

Referring more particularly to FIG. 7, the container end wall 30 is provided with a stepped bore 182 which is diametrally reduced from the inside surface 184 to the outside surface 186 forming a shoulder 188. A complementarily-configurated insert 190 is mounted in the bore 182. The insert 190 has a centrally disposed through-bore 192 which tapers outwardly at 194 to form a generally conical ramp surface 196.

An elongated coupling nipple generally designated 198 is adapted to be situated within the bore 192. The nipple 198 has an elongated shaft 200 with a cylindrical through-bore 202 traversing its entire length and opening at the leading end 204 and at the trailing end 206. The trailing end 206 is annularly enlarged to form a shoulder 208. The membrane 84 is preferably drawn over the trailing end 206 around the shoulder 208 through the bore 192. An elastomeric O-ring 210 is preferably disposed around the shaft 200 adjacent the shoulder 208 so as to urge the membrane 84 into contiguous relation with the shoulder 208. Attachment of the membrane to the shaft 200 by O-ring 210 allows the membrane and coupling nipple to be handled as a single unit when placing the membrane in container 22 or removing the membrane from container 22.

Intermediate the length of the shaft 200 is a diametrally enlarged exteriorly-threaded portion 212. A thumb nut 214 having a diametrally-reduced annular skirt 216 has an internally-threaded bore 218 in which the shaft 200 is threadedly connected. The thumb nut 214 threadedly engages the intermediate portion 212 and, as thumb nut 214 is advanced on the shaft 200, the skirt 216 is urged against insert 190 forcing the shoulder 208 of shaft 200 tightly against the O-ring 210. The O-ring is thus compressed by the shoulder 208 againt the ramp surface 196, the O-ring 210 simultaneously causing the membrane 84 to form a fluid-tight seal against the nipple 198 and also shielding the membrane 84 from damaging contact with the insert 190. It can be appreciated by reference to FIG. 7, that the trailing end 206 of nipple 198, when in the assembled position illustrated in FIG. 7, is flush with the interior surface 184 of the end wall 30. Thus, the membrane 84 can be completely sealed to the nipple 200 independent of any vertical pressure exerted on the stacked separators 66, 100 or 102 (see FIG. 1).

The leading end of the nipple 198 is forwardly tapered as at 220 to facilitate coupling of the nipple 198 with a blood conduit 222. The conduit 222 may be a conventional intravenous catheter or merely flexible tubing leading from conventional hemodialyzing support systems such as blood pumps and the like. The conduit 222 is preferably press-fit over the nipple 198 as shown best in FIGS. 1 and 7.

The method

Having described a presently preferred apparatus embodiment of the invention, the improved method of hemodialysis and novel method of assembling the hemodialyzer will now be described.

Figure 8:
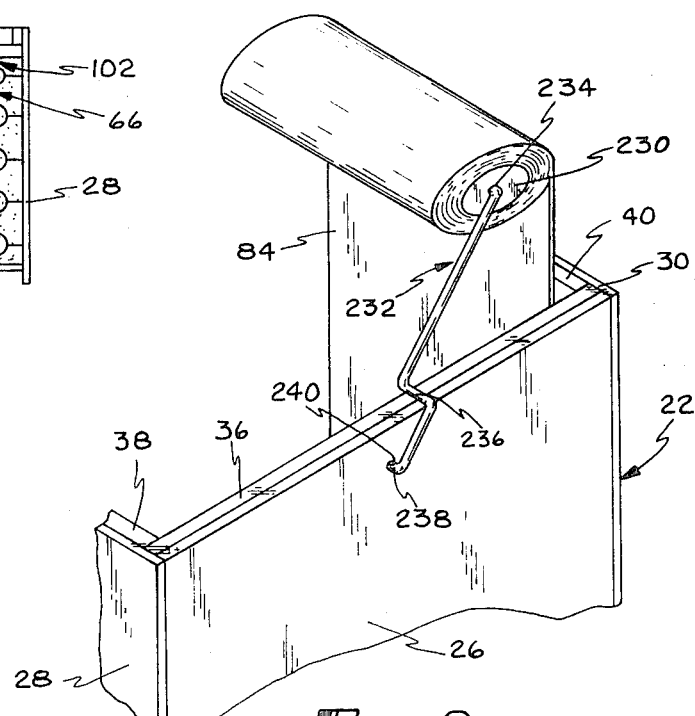
FIG. 8 is a fragmentary perspective view of apparatus facilitating insertion of the membrane into the apparatus of FIG. 1.

In assembling the dialysate container 22, the front wall 24 and lid 44 are removed from the container to facilitate insertion of the separators 66, 100 and 102. Initially, one end of membrane 84 is attached to nipple 198 with O-ring 210 and secured in the end wall 30 as shown in FIG. 7. Preferably, the membrane 84 has been pre-wound onto a spool 230 as shown in FIG. 8. It is presently preferred that the membrane 84 be pre-sterilized with ethylene oxide or the like and, if desired, the coupling nipples may be attached to the membrane and simultaneously sterilized therewith. When sterile end caps (not shown) are placed over the leading end 220, the sterility of the entire blood path through the membrane and ports may be preserved during assembly and disassembly of the container and separators.

The spool 230 upon which the membrane 84 is wound is adapted to be supported by a bracket generally designated 232 which has a connecting dog 234 press-fit into the spool 230. When desired, the spool 230 may be removed from the bracket 232 by exerting a separating pressure upon the spool or bracket and forcing the bracket out of attachment with the spool. In this way, the bracket may be reused when the membrane 84 is replaced.

Bracket 232 has a laterally-extending portion 236 spaced intermediate the length of the bracket 232 and bracket 232 terminates in a laterally-projecting dog 238 adapted to be received by blind bore 240 in the rear side 26 (see also FIG. 5). The bracket 232 pivots about the dog 234 in the bore 240 so that the bracket 232 swings from a position adjacent side 30 to a position adjacent side 28 vice versa. The laterally-extending portion 236 limits the side-to-side position of bracket 232 when the portion 236 rests upon the upper surface of the rear side 26 and connected rib 36.

Figure 9:
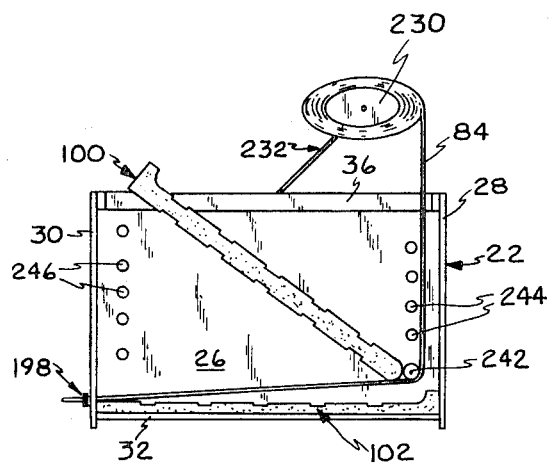
FIGS. 9-11 schematically illustrate sequential steps of the method of assembling the hemodialyzing apparatus of FIG. 1.
Figure 10:
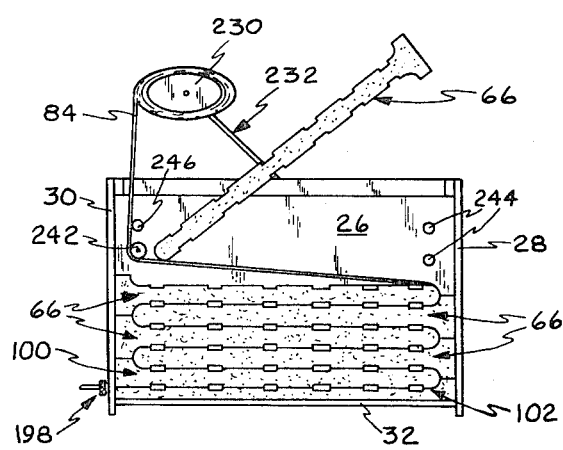
Figure 11:
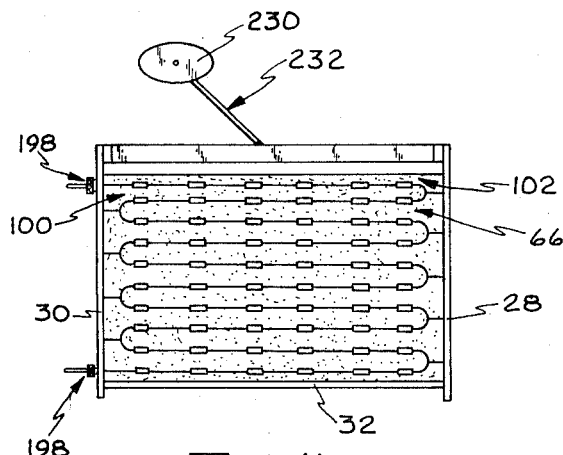

The method of assembling the separators 66, 100 and 102 within the container 22 is best understood by reference to FIGS. 9–11. As shown in FIG. 9, a separator 102 is situated upon the bottom 32 of container 22. The separator 102 is placed in position preferably after the membrane has been connected to nipple 198 and mounted in end wall 30. Thereafter, the bracket 232 is positioned as shown in FIG. 9. The membrane 84 is drawn taut over the upper surface of separator 102 by placing a dowel 242 in the lowermost one or blind bores 244 in the rear wall 26, bores 244 being disposed in a generally vertical array adjacent the end wall 28. The dowel 242 prevents creases or wrinkles from becoming formed in that portion of the membrane 84 which overlies separator 102. Also, dowel 242 facilitates insertion of the rounded foot portion of separator 100 into the neck portion of separator 102 (compare FIG. 2).

When the separator 100 has been properly positioned over separator 102, the dowel 242 is removed and bracket 232 is displayed to the position illustrated in FIG. 10. Thereafter, the dowel 42 is inserted in the lowermost one of vertically-arrayed blind bores 246 disposed adjacent end wall 30. The membrane 84 may then be drawn tight around the dowel 242 again to facilitate insertion of separator 66 as shown in FIG. 10. With continued reference to FIG. 10, the bracket 232 is alternately displaced back and forth and the dowel 242 is serially moved into each of the blind bores 244 to 246 to facilitate insertion of membrane 84 into the recesses between separators 66, 100 or 102.

When the membrane has been placed across the uppermost separator 100, as shown in FIG. 11, the membrane and attached nipple 198 are secured in the end wall 30. Thereafter, the uppermost separator 102 is placed on top of the separator 100 with the membrane sandwiched therebetween. Thus, as shown in FIG. 11, the membrane traverses a tortuous or convoluted path from the lowermost nipple 198 between each of the separators to the upper most nipple 198. When the separators are assembled as shown in FIG. 11, the lid 44 may be inserted.

The attachment of the lid 44 and the front side 24 can best be understood by reference to FIG. 5. The lid 44 is inserted in a position left to right as shown in FIG. 5 beneath ribs 36, 38 and 40. Initially, the lid 44 is disposed loosely over the upper separator 102.

Thereafter, the front side 24, including the attached chute 50, is placed juxtaposed the bottom 32 so that tongue 164 is inserted into groove 168. Thereafter, the front side 24 is forced against sides 28 and 30 until tongue 162 is situated above or slightly within groove 166 in the lid 44. Clamps 120 are then adjusted to simultaneously exert a downward force upon the assembled separators and an upward force upon the lid 44. When the tightening force is exerted by the clamps 120, the front side 24 is rigidly connected to the remaining portions of container 22.

The disassembly of the container 22 is essentially the reverse of the assembly. For example, the clamps 120 are loosened until the front side 24 can be easily removed. After removal of the front side and lid 44, the uppermost separator 102 is removed and nipple 198 uncoupled from the end wall 30. Thereafter, the membrane is attached to the spool 230 and the spool is wound so that the membrane begins to accumulate thereon. As each of the succeeding separators is removed, the membrane is continuously wound upon the spool. It is noted that as the membrane is wound upon the spool, blood remaining in the membrane is forced out of the lower coupling nipple 198 so that it can be returned to the patient. Alternatively, if the membrane has been washed with a saline or other suitable washing solution, the washing solution can be discarded.

When all of the separators have been removed from the container 22, the lower coupling nipple 198 may then be removed and the membrane and coupling nipples may be discarded. If desired, the coupling nipples 198 may be removed from the membrane 84 prior to discard and resterilized for use with a fresh membrane.

In the operation of the dialyzer 20, blood from a patient is directed through upper conduit 222 (FIG. 1) to the upper portion of container 22 so that gravity will assist the flow of blood from the upper nipple 198 to the lower nipple 198. The blood will flow through the membrane over the convoluted path defined by the separators 102, 100 and 66.

In the FIG. 5 view, the blood flows in a direction into and out of the plane of the drawing. Dialysate is pumped under pressure in the direction of arrow 146 through conduit 144 into the chamber 148. Preferably, the dialysate is maintained at a pressure of approximately one pound per square inch in chamber 148, although any one of a wide range of pressures could be used depending upon the resistance to flow of the dialysate, the pressure of the blood in the membrane 84, the flow rate of the blood in membrane 84 and other variable conditions. Whatever pressure is exerted by the dialysate in chamber 148, it is presently preferred that the pressure exerted by the blood in membrane 84 be slightly greater. The blood must exert a greater pressure in membrane 84 in order to provide for ultrafiltration of the blood, the ultrafiltration allowing the blood to pass excess water into the dialysate solution. Moreover, a negative pressure differential between the blood and dialysate incurs the risk of patient injury in the event the membrane should fail.

The dialysate flows from the chamber 148 through ports 90 around both sides of the membrane 84 between the membrane 84 and the point support surface carried by the separator. Thus, the flow path of the dialysate crosses the flow path of the blood and, over most of the length of the membrane, is generally normal to the flow of blood. As the dialysate emerges from the ports 92, it falls by force of gravity into the chamber 152 and through the slots 154 and 158 to the chute 50. The crossflow of dialysate minimizes the resistance to flow which the dialysate must overcome and thus only very low pressures are required to drive the dialysate across the membrane.

In the illustrated embodiment of the invention, the dialysate is exposed to the blood-carrying membrane for only a short period of time. This practice is substantially remote from the conventional Kiil-type hemodialyzers. The short period of time in which the dialysate is exposed to the blood-carrying membrane allows the dialysate to be recirculated over the membrane. Thus, it is presently preferred that dialysate emerging from the container 22 through chute 50 be recirculated through the port 138 (FIG. 5) over the membrane 84. Recirculation maximizes the efficiency of the dialysate and minimizes the size of the apparatus necessary to dialyze a volume of blood because large volumes of fresh dialysate need not be required.

From the foregoing, it can be readily understood that the apparatus and method described provide an effective and reliable system of hemodialysis. The method of assembly of the disclosed embodiment of the apparatus is simple and does not require special training for assembly. Moreover, contrary to prior art devices, the membrane and coupling nipples may be pre-sterilized as a unit prior to use and assembly in the hemodialyzer of this invention without contamination. Also, the effective crossflow of dialysate and blood provides for effective hemodialysis without exerting high pressures on the dialysate and the blood.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A hemodialyzer comprising:
   a plurality of separator means, each separator means comprising a point support surface;
   means containing the separator means in assembled relation;
   membrane means disposed over the point support surface for conducting blood along a pleated path defined by the separator means;
   means within the cointaining means defining a fluid path for dialyzing fluid across the separator means, said defining means conducting the dialyzing fluid a substantially shorter distance than that of the pleated blood path; and
   means for displacing dialyzing fluid along the fluid path across the membrane means such that the dialyzing fluid crosses the path of the blood flow.

2. A hemodialyzer comprising:
   container means;
   a plurality of stacked plate-like membrane support means assembled in the container means so as to define a tortuous path;
   membrane means for conducting blood, the membrane means comprising a hollow conduit of flexible material removably disposed over the tortuous path and having ingress and egress ends;
   coupling means mounted at each of the ingress and egress ends of the membrane means, the coupling means comprising a hollow passageway for directing blood to the interior of the hollow conduit and being in communication with a source of blood exterior of the container means; and
   means for directing dialyzing fluid over the exterior of the membrane means so as to cross the direction of blood flow and so as to traverse a distance substantially less than the distance traversed by the blood.

3. A hemodialyzer as defined in claim 2 wherein said membrane support means are formed of lightweight synthetic material.

4. A hemodialyzer as defined in claim 2 wherein said coupling means comprises means for adjusting the position of the coupling means relative to the container means to accommodate adjustment of the tension exerted on the membrane means over the support means.

5. A hemodialyzer as defined in claim 2 wherein said coupling means comprises means accommodating adjustment of the position of the membrane means relative to the coupling means so that the tension exerted on the membrane over the support means can be varied.

6. A hemodialyzer as defined in claim 2 further comprising means for recirculating the dialyzing fluid over the exterior of the membrane.

7. Hemodialyzing apparatus comprising:
   a container having an inlet port and an outlet port situated so as to accommodate transverse flow of dialyzing fluid through the container;
   a plurality of separators forming a convoluted path crossing the flow of the dialyzing fluid and comprising at least one generally flat surface having a large number of densely concentrated tiny raised points, each point generally uniformly spaced from the next, the separators being individually separable one from another and, when assembled, confinable within the container and the spaces between the points providing a flow path for dialyzing solution across the separators;
   an elongated tubular membrane traversing the length of the convoluted path over the raised points, the tubular membrane having two open ends and being removable from the convoluted path when the separators are disassembled to accommodate facile replacement of the membrane; and
   hollow coupling nipples connected in each end of the tubular membrane and forming a seal with the membrane independent of any force exerted through the separators, the nipples penetrating the container to the exterior and at least one of the coupling nipples comprising an inlet port for blood and another coupling nipple comprising an outlet port for blood so that the blood flows generally longitudinally through the membrane.

8. Hemodialyzing apparatus as defined in claim 7 wherein said container allows the separators to be stacked generally vertically and further comprising means tilting the container through any one of a plurality of positions angularly related to the horizontal.

9. Hemodialyzing apparatus as defined in claim 7 wherein each of said separators and densely concentrated points are unitarily formed of a lightweight synthetic resin.

10. Hemodialyzing apparatus as defined in claim 7 wherein said separators are assembled in a vertically stacked array, said array being separated from the inlet port in the container by a hollow chamber which allows generally uniform distribution of dialyzing fluid over the convoluted path formed by the separators.

11. Apparatus for dialyzing blood comprising:
    container means;
    means directing dialyzing solution through the container means along a first path;
    stacked plate-like means supporting an elongated tubular membrane along a second, S-configurated path in the container means so that at least part of the membrane is exposed to the dialyzing fluid and the longest axis of the tubular membrane crosses the flow of the dialyzing solution, the length of the first path being substantially less than the length of the second path;
    means conducting blood through the tubular membrane; and
    means recirculating the dialyzing solution through the container means.

12. A method of assembling hemodialyzing apparatus comprising the steps of:
    suspending a spool of tubular membrane upon a reciprocably displaceable bracket;
    anchoring one end of the elongated tubular membrane in one end of a container;
    drawing the unanchored length of the membrane toward the opposite end of the container by displacing the spool-holding bracket toward the opposite end of the container;
    inserting a separator into the container over the membrane and allowing the separator to come to rest in the container generally parallel to a position of the length of the membrane;
    wrapping the membrane around one end of the separator and drawing the remaining length of the membrane toward the one end of the container by oppositely displacing the spool-holding bracket toward the one end of the container and repeating the mentioned inserting, wrapping, displacing and drawing steps, as necessary, to fill the container to a predetermined level; and
    anchoring the other end of the membrane in the container.

13. A method as defined in claim 12 wherein each said drawing step is followed by urging the membrane into a predetermined position and maintaining the membrane in said position until the inserting step has been completed.

14. A method as defined in claim 12 wherein said inserting steps comprise vertically stacking complementarily configurated support members one on top of the other while serially practicing said drawing step so that the membrane is sandwiched between each support member.

15. A method as defined in claim 14 further comprising tilting the vertically stacked support members to an oblique orientation between the vertical and horizontal.

16. A method as defined in claim 12 further comprising serially dispensing portions of the length of the elongated membrane by reciprocating the displaceable spool-holding bracket from end to end of the container.

17. A method as defined in claim 16 wherein said dispensing step comprises mounting the spool upon a movable bracket and displacing the bracket from one position to another as the membrane is dispensed.

18. A method as defined in claim 12 further comprising disassembling the hemodialyzing apparatus by serially removing each separator and winding the membrane upon a spool as each separator is removed so that blood is stripped from the membrane.

19. A method of dialyzing blood comprising pumping blood along a continuous pleated path from a high position to a low position, pumping dialyzing fluid in a direction essentially normal to the flow path of the blood, separating the blood and dialyzing fluid by a tubular membrane and repeatedly exposing all of the blood which enters the membrane to fresh portions of dialyzing fluid.

20. A separator for a hemodialyzer comprising:
    an elongated body having a generally centrally disposed membrane receiving recess traversing the length of the body;
    a head portion integral with the body and comprising at least one generally flat face which is offset from the body, the face being separated from the body by a neck portion; and
    a foot portion integral with the body and having a configuration which is complementary to the neck portion whereby another essentially identical separator is nestable foot to neck with the one separator, the recesses forming a membrane receiving passageway therebetween.

21. A separator as defined in claim 20 wherein said neck portion is arcuate in configuration and wherein said foot portion is arcuate in configuration, the radii of the neck and foot portions being essentially identical.

22. A separator as defined in claim 20 wherein said head and body portions together are generally T-shaped in longitudinal cross-section.

23. A separator as defined in claim 20 wherein said head and body portions are generally L-shaped in longitudinal cross-section.

References Cited

UNITED STATES PATENTS

| | | | |
|---|---|---|---|
| 3,326,380 | 6/1967 | Fenchner et al. | 210—321 X |
| 3,396,849 | 8/1968 | Lande et al. | 210—321 |
| 3,585,131 | 6/1971 | Esmond | 210—493 X |
| 3,342,328 | 9/1967 | Swenson | 210—321 X |
| 3,442,388 | 5/1969 | Pall | 210—493 X |

FRANK A. SPEAR, Jr., Primary Examiner

U.S. Cl. X.R.

210—321, 493